July 1, 1930.  W. R. WARFORD  1,769,246
BOARD MEASURING INSTRUMENT
Filed July 13, 1927
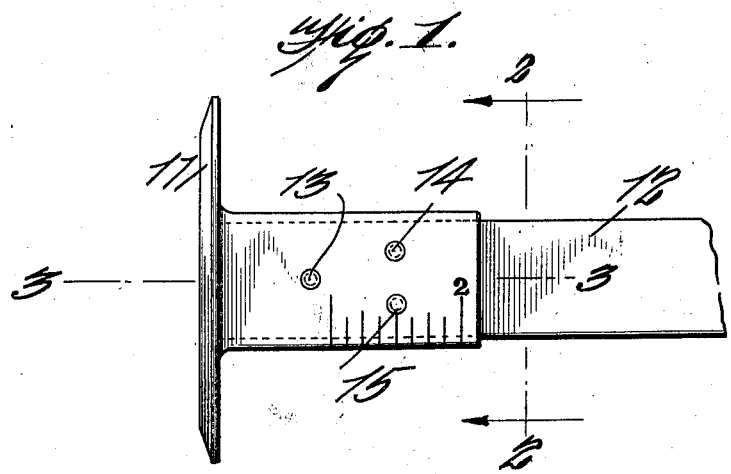
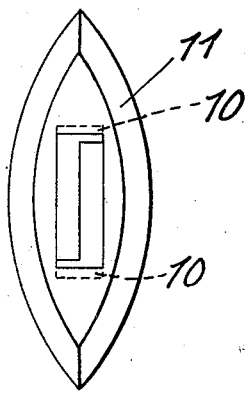
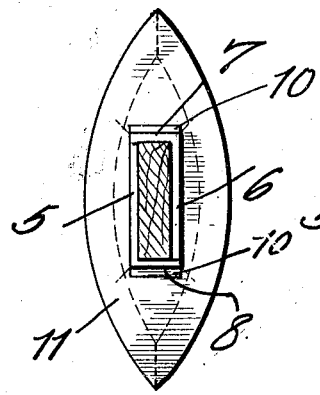
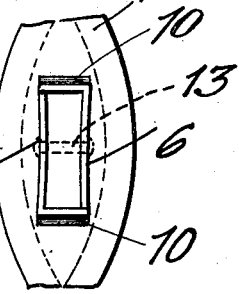
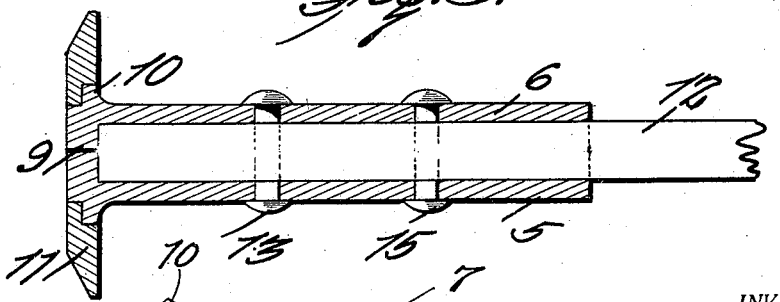
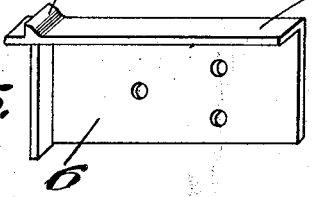
INVENTOR.
William R. Warford.
BY
ATTORNEY.

Patented July 1, 1930

1,769,246

UNITED STATES PATENT OFFICE

WILLIAM R. WARFORD, OF PINE BLUFF, ARKANSAS

BOARD-MEASURING INSTRUMENT

Application filed July 13, 1927. Serial No. 205,476.

This invention relates to board measuring instruments, and particularly to devices known as rule sticks.

It is an object of this invention to provide a mounting for a rule stick or a rule head which will serve to clamp and protect the stick where greatest wear is occasioned on the device during its use. The rule head is usually applied to a board and in squaring the head with the edge of the board, there is more or less movement imparted to the rule in positioning it.

It is a further object of this invention to provide a rule head which will completely encase the sides and edges of the rule stick in order that it will be protected while the rule is being manipulated.

A further object of my invention is to provide a socket for lumber rules and a head for the socket members, the socket forming members having at one end shoulders which overlie the internal margins of an opening through the head. The socket members each comprise sides and angular projecting portions which in use will overlie the flanged ends of the socket forming members, thus providing rigid socket members which may be spread apart at their open end to receive the flat rule, and when the rule has been inserted, the side members will be drawn together to compress the end of the rule between the sides that form the socket.

My invention also provides a construction whereby the head and socket forming members may be connected by brazing, welding, soldering, or in any other suitable manner, the points of connection being at the narrow sides of the socket.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a view in elevation of a rule head showing a fragment of the stick;

Figure 2 illustrates a sectional view on the line 2—2 of Fig. 1;

Figure 3 illustrates a sectional view on the line 3—3 of Fig. 1;

Figure 4 illustrates a detail view of the socket;

Figure 5 illustrates a perspective view of one of the side members and Figure 6 illustrates an end elevation.

Referring to the drawings, the head 11 is provided with a rectangular opening for the reception of the ends of the members 5 and 6, the head having beyond the ends of the opening transverse recesses to receive the shoulders 10, the shoulders being formed upon the ends 9 of the socket members 5 and 6, these socket members each having at one end portions of increased thickness which abut when the parts are assembled to lie snugly within the opening through the head.

The socket members 5 and 6 consist of side portions and integral end portions 7 and 8, said integral portions overlapping the adjacent section. The side portions are provided with apertures for the reception of rivets 13, 14 and 15. By the construction shown, I provide a socket member consisting of two angular side pieces which may be drawn together without compressing the thin edges of the rule which may be spread to force the rule against the closed end formed by the socket members.

In practice, the head may be brazed or welded at the junction of the narrow sides with said head, as the rule rests upon its wide sides in use.

In the construction of the socket, the side walls 5 and 6 are spaced apart a distance slightly less than the thickness of the rule stick 12 which is to be seated in the socket and when the rule stick, which is usually of rather flexible wood, is inserted between the two side walls 5 and 6, it separates these two walls to a limited extent and the side walls are therefore caused to press against the rule stick in order to insure a tight fit and the absence of lost motion between the joint of the stick and socket.

After the parts are assembled, as shown in Fig. 3, suitable fastenings 13, 14 and 15, such as rivets may be employed, extending through the side plates and the rule for securing the parts together. Of course the number of rivets may be changed to suit particular requirements, but in practice, the arrangement shown has been found efficient and satisfactory in use.

I claim:

1. A rule head and socket comprising members angular in cross section, each of which is adapted to engage a side and an edge of a rule and together to enclose the same thus forming a socket, said members being so related that the portion of one member that engages the edge of a rule overlaps the adjacent edge of the coacting member that engages the side of the rule, one end of each member having a transversely and interiorly disposed extension, said extensions abutting each other when the members are assembled and together forming a closed end for the socket, and a rule head adapted to fit on the closed ends of said socket.

2. A rule head and socket comprising members angular in cross section, each of which is adapted to engage a side and an edge of a rule and together to enclose the same, the said members having transversely and interiorly disposed projections adjacent one end adapted to abut and together to form a closed end when the members are assembled thereby forming a rule socket, a shoulder exteriorly disposed on each member adjacent the closed end of the socket, and a rule head having an aperture therethrough adapted to fit on the said members when assembled, the said aperture having a shoulder cooperating with the shoulders of the said members.

WILLIAM R. WARFORD.